UNITED STATES PATENT OFFICE.

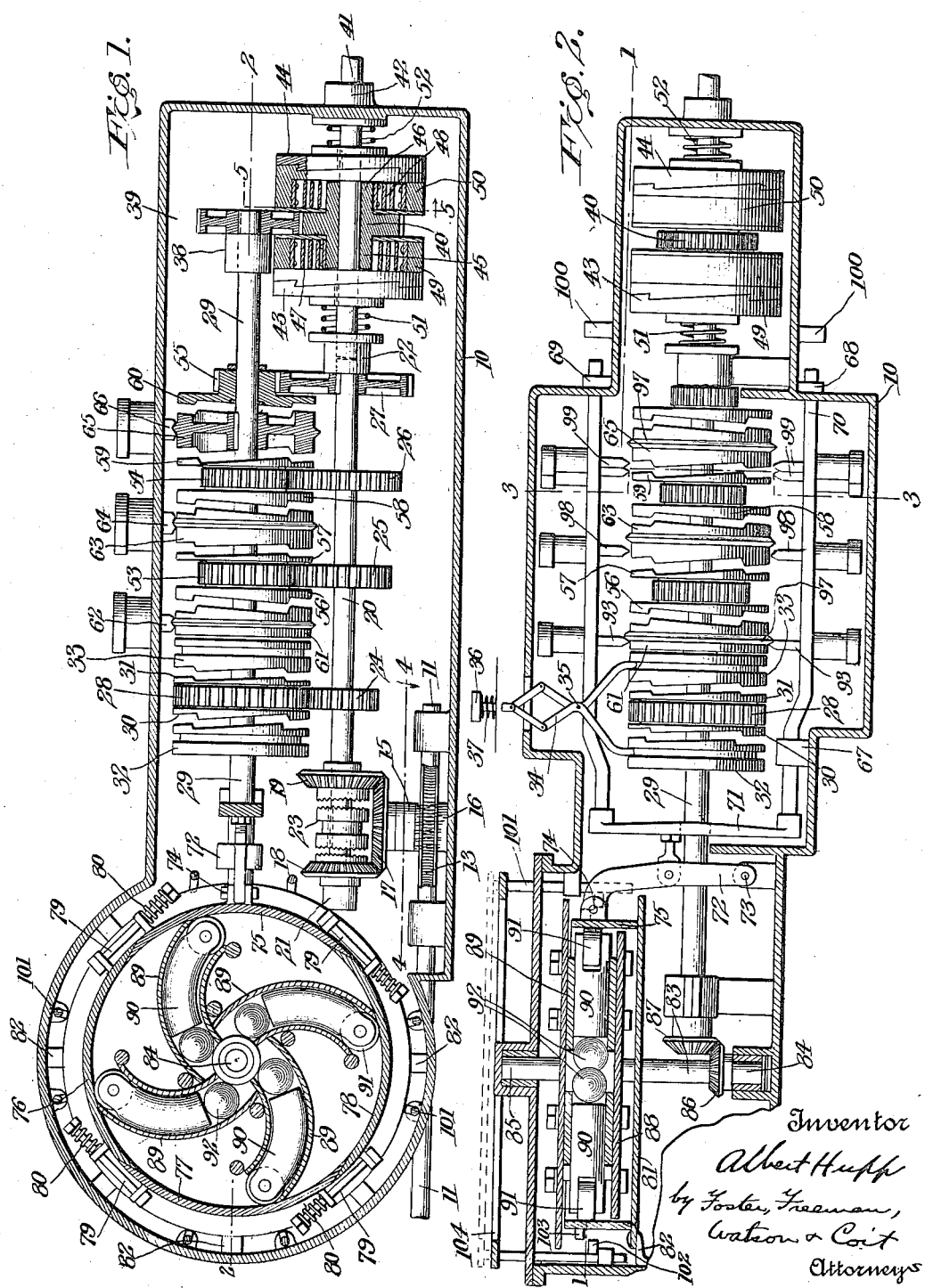

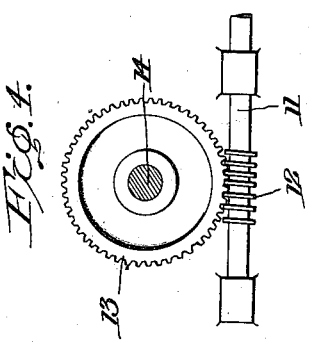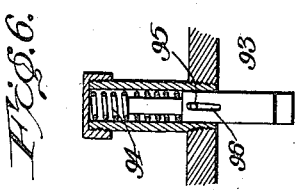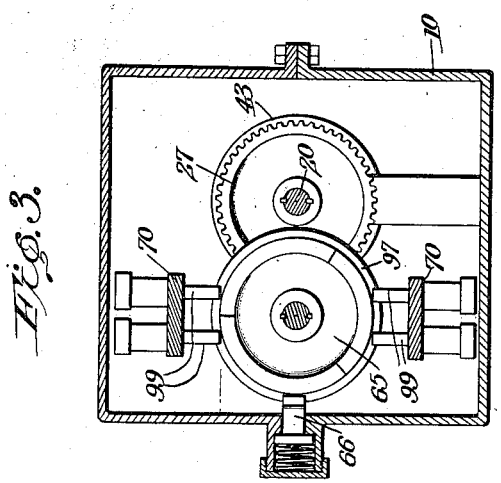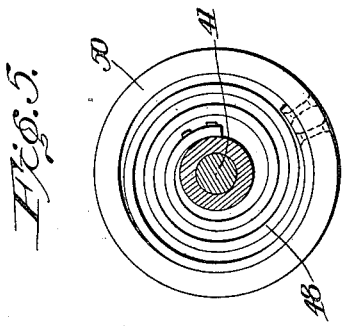

ALBERT HUPP, OF WASHINGTON, DISTRICT OF COLUMBIA.

AUTOMATIC TRANSMISSION-GEARING.

1,181,313.　　　　　Specification of Letters Patent.　　Patented May 2, 1916.

Application filed January 15, 1916. Serial No. 72,280.

*To all whom it may concern:*

Be it known that I, ALBERT HUPP, a citizen of the United States, and resident of Washington, District of Columbia, have invented certain new and useful Improvements in Automatic Transmission - Gearing, of which the following is a specification.

This invention relates to gearing for vehicles and particularly for automobiles and has for its object the provision of an automatically operating gearing wherein the speed ratios are changed in accordance with the speed of the vehicle, that is, as the speed of the vehicle increases the different gear sets are successively thrown in automatically, thus performing the function which has heretofore been performed manually in automobiles.

A further object of the invention is to provide a gearing which will permit the engine to be run at the most efficient speed and the speed of the vehicle controlled largely by the supply of motive fluid.

Other objects and the features of novelty will be apparent from the following description taken in connection with the accompanying drawings in which:—

Figure 1 is a horizontal section through a gear box containing a transmission gearing for an automobile in accordance with my invention, the section being substantially on the line 1—1 of Fig. 2. Fig. 2 is a section substantially on the line 2—2 of Fig. 1. Fig. 3 is a transverse section on the line 3—3 of Fig. 2. Fig. 4 is a section on the line 4—4 of Fig. 1. Fig. 5 is a section on the line 5—5 of Fig. 1, and Fig. 6 is a section of a detail.

Referring to the drawings, 10 indicates a casing in which is mounted a shaft 11 which may be driven from the motor of the vehicle. The shaft 11 carries a worm 12 which meshes with a gear 13 on the shaft 14, the shaft 14 being supported in bearings 15 and 16 and also carrying a bevel gear 17. The gear 17 meshes with the gears 18 and 19 which are preferably loosely mounted on a shaft 20 supported in bearings 21 and 22. Between the gears 18 and 19 there is a shiftable jaw clutch 23 splined on the shaft 20 and adapted to interlock with either of the gears 18 and 19 to form a driving connection between these gears and the shaft 20. The clutch 23 may be shifted in any suitable or well known manner and as devices for purpose are commonly known in this art, illustration of such device has been omitted for the sake of clearness. The shaft 20 carries a series of gears 24, 25, 26 and 27, the number of these gears being optional and more or less than the number illustrated may be used. The gear 24 meshes with a gear 28 loosely mounted on the shaft 29. The ratio between the gears 24 and 28 may be as desired and is shown as 1 to 2. The gear 28 has secured to the opposite sides thereof clutch members 30 and 31. Adjacent to the clutch member 30 is a shiftable clutch member 32 which is splined on the shaft 29 and is adapted to engage with the clutch member 30 and form a driving connection between the gear 28 and the shaft 29, when the gear 28 is rotating in what will be termed the reverse direction, that is the direction to propel the vehicle backward. The reversal of the rotation of the gear 28 is effected by shifting the clutch 23. Ordinarily the clutch 23 will be in engagement with the gear 19 to drive the vehicle forward but when the clutch 23 is shifted into engagement with the gear 18 the rotation of the gear 28 will be reversed to drive the vehicle backward. Adjacent the clutch member 31 is a shiftable clutch member 33 which is adapted to be moved into engagement with the clutch member 31 to form a driving connection between the gear 28 and the shaft 29 when the gear is rotating in the forward direction.

The clutch members 32 and 33 may be shifted by any suitable mechanism and for this purpose I have shown the tongs 34 which have a fixed pivot 35 and which may be actuated from a pedal 36 to throw the clutch members 32 and 33 into engagement with the adjoining clutch members 30 and 31 respectively. A spring 37 may be employed for the purpose of disengaging the clutch members.

The shaft 29 has one end supported in the bearing 38 and carries adjacent this bearing a gear 39 which meshes with a gear wheel 40 on the driven shaft 41 which may be connected with the driving axle of the vehicle. The shaft 41 is mounted in the bearings 22 and 42 and has splined thereon the clutch members 43 and 44. The gear 40 is loose on the shaft 41 and to the extended hubs 45 and 46 of the gear oppositely coiled spiral springs 47 and 48 are connected. The outer ends of these springs are connected respectively with the clutch members 49 and 50. It will thus be seen that when the gear 40 is rotated in one direction the spring 47 would tend to be wound up whereas the spring 48 would be unwound. The clutch member 43 is normally pressed into engagement with the clutch member 49 by a spring 51 and the clutch member 44 is pressed into engagement with the clutch member 48 by a spring 52.

From the foregoing it will be understood that when the gear 40 is rotated in one direction the power will be transmitted through the spring 47 and the clutch members 49 and 43 to the shaft 41 whereas when the gear 40 is rotated in the opposite direction the power will be transmitted through the spring 48 and the clutch members 50 and 44 to the shaft 41. Thus the gear 40 will be flexibly connected with the shaft 41 in either direction of rotation, the springs 47 and 48 acting as shock absorbers.

The gear 25 meshes with a gear 53 and the ratio between these gears may be 1 to 1 or as preferred. The gear 26 meshes with a gear 54 and the ratio between these gears is shown as 3 to 2 but may be as desired. The gear 27 meshes with a gear 55 and the ratio is illustrated as 2 to 1 but may be any other ratio desired. The gears 53, 54 and 55 are loosely mounted on the shaft 29 and the gear 53 has secured on opposite sides thereof the clutch members 56 and 57. The gear 54 has secured on opposite sides thereof the clutch members 58 and 59 and the gear 55 has secured thereon the clutch member 60.

A clutch member 61 is splined on the shaft 29 and adapted to be moved into engagement with the clutch member 56 by mechanism which will be hereinafter described. The clutch member is normally held in the disengaged position by a suitable detent 62. A clutch member 63 is splined on the shaft 29 between the clutch members 57 and 58 and adapted to be moved into engagement with either and is held in the mid position, out of engagement with the clutch members 57 and 58 by a detent 64. A clutch member 65 is splined on the shaft 29 between the clutch members 59 and 60 and adapted to be moved into engagement with either of these clutch members but is normally held in a mid position out of engagement with the clutch members by the detent 66.

Slidably arranged in suitable bearings 67, 68, and 69 in the casing 10 is a yoke 70 the cross bar 71 of which is operatively connected with the lever 72 which has one end fulcrumed at 73. The opposite end of the lever 72 is pivotally connected at 74 with the part 75 of an expansible cylinder. This expansible cylinder also comprises the parts 76, 77 and 78 and these parts are connected together by sliding bolts 79 and suitable springs 80 which operate to normally contract the cylinder and resist the expansion thereof.

The parts 75, 76, 77 and 78 of the expansible cylinder are supported on the stationary plate 81 which may be supported on brackets 82 on the inside of the casing 10. A vertical shaft 83 extends through the plate 81 and is supported in suitable bearings 84 and 85. This shaft carries a bevel gear 86 which meshes with a gear 87 on the shaft 29 so that the shaft 83 will be at all times driven at a speed proportional to the speed of the shaft 29 and in the drawings the gears 86 and 87 are illustrated as of the same size and therefore the shaft 84 will have the same speed of rotation as the shaft 29. The shaft 83 has secured thereto above the plate 81 a disk 88 on which there is secured a series of curved tubes 89 each of which carries a member 90 having a roller 91 on the outer end thereof which runs on the inner surfaces of the members 75, 76, 77 and 78 as the shaft 84 rotates. Arranged against the inner ends of the members 90 are balls 92 or other suitable centrifugal weights which are adapted, as the speed of the shaft 84 increases, to force the members 90 out of the tubes 89 and thereby effect the expansion of the cylinder formed by the members 75, 76, 77 and 78. The movement of the member 75 is transmitted to the yoke 70 by means of the lever 72.

The opposite sides of the yoke 70 carry spring pressed fingers 93 as shown in detail in Fig. 6. These fingers are normally pressed into engagement with the periphery of the clutch members 61, 63 and 65 by springs 94, the inward movement of the fingers being limited by means of a pin 95 which operates in a suitable slot 96 in the finger. Each of the clutch members is provided with a V-shaped flange 97 adapted to be engaged by the fingers 93.

From Fig. 2 it will be seen that the flange 97 on the clutch member 61 is engaged by the coöperating fingers 93 so that the first movement of the yoke 70 will cause the clutch member 61 to be shifted into engagement with the clutch member 56 and thus the shaft 29 will be driven through the gears 25 and 53. It will be understood that in starting the pedal 36 will be depressed so as to throw the clutch member 33 into engagement with the clutch member 31 and form a drive through the gears 24 and 28. All of the other sets of gears will be rotating idly while the shaft 29 is being driven through any particular set and when the drive is through the gears 24 and 28 and the speed of the vehicle increases, due to change in grade or to increase in the supply of motive fluid to the motor, the clutch 61 will be automatically shifted to cause the drive to be through the gears 25 and 53. As soon as these gears take up the drive the clutch members 31 and 33 will become automatically disengaged due to the member 33 running ahead of the member 31. The driving through the gears 25 and 53 will permit a lower engine speed for a given vehicle speed than when the drive is through the gears 24 and 28. If the vehicle speed, or the speed of the shaft 29 which is directly proportional, increases when the drive is through the gears 25 and 53, the fingers 98 will engage with the clutch member 63 and move the latter into engagement with the clutch member 58 so that the drive will then be taken through the gears 26 and 54 which have a higher ratio than the gears 25 and 53. When this occurs the clutch members 56 and 61 become automatically disengaged on account of the clutch member 61 running ahead of the member 56. Further increase in speed of the shaft 29 will cause the fingers 99 to engage with the clutch member 65 and move the latter into engagement with the clutch member 60 so that the drive will then be taken through the gears 27 and 55 and the clutch members 58 and 63 will be automatically disengaged. It will be noted that the fingers 99 are in pairs so that when the speed increases above the point sufficient to effect the engagement of the clutch members 60 and 65 the fingers 99 will arrange themselves on opposite sides of the flange 97 of the clutch 65 and as this is the maximum speed ratio further movement of the yoke 70 is prevented by engagement with suitable stops 100.

Upon a reduction in the speed of the shaft 29 the yoke 70 will be drawn to the left, in Fig. 2, and the fingers 99 will carry the clutch member 65 out of engagement with the clutch member 60 and into engagement with the clutch member 59. As will be apparent from an inspection of the drawings the fingers 93 and 98 slip over their respective flanges 97 as the speed of the shaft 29 increases so that upon the decrease in the speed of this shaft the fingers 93 and 98 will be upon the right-hand side of the flanges 97 of the clutch members 61 and 63. After the clutch members 65 and 59 have been engaged, a further reduction in speed will carry the clutch member 63 into engagement with the clutch member 57, so that the drive will then be through the gears 25 and 53. A further reduction in speed will carry the finger 98 over the flange 97 of the clutch 63 and the latter will become disengaged from the clutch 57. The drive may then be had through the gears 24 and 28 by depressing the pedal 36.

Under certain conditions it is desirable to utilize the engine of the vehicle as a brake, as when descending hills, and in order to do this with my improved form of gearing I have added means to prevent the governing mechanism from changing the drive from the lower to the higher speed ratios as the speed of the vehicle increases. As illustrated this means consists of a series of pins 101 which are adapted to be raised from the full line position shown in Fig. 2 to the dotted line position when blocks 102 thereon will be engaged by the block 103 on the parts 75, 76, 77 and 78 and thus act as stops for the parts 75, 76, 77 and 78 and prevent the expansion of the cylinder formed by these parts. The driver of the vehicle may then hold the clutch members 32 and 33 in engagement with the clutch members 30 and 31 respectively so that the vehicle will drive the shaft 20 through the gears 24 and 28, which gears constitute the lowest speed ratio so that the engine would be driven at the maximum speed relatively to the vehicle wheels. By preventing the expansion of the parts 75, 76, 77 and 78 there will be no tendency to shift the clutches 61, 63 and 65. The pins 101 may be supported in any suitable manner as on a ring 104 which may have connected therewith suitable mechanism whereby it may be actuated from the driver's position in the vehicle.

While I have shown a particular form of speed responsive mechanism it will be understood that any suitable speed responsive device may be employed and that the invention is in no wise limited to the particular mechanism illustrated. It will also be understood that many of the parts of the mechanism are shown more or less diagrammatically and that such parts will be subject to such variation as may be desirable to conform to existing standards of design. I therefore do not wish to be limited to the exact mechanism shown and described but claim all equivalents thereof which come within the spirit of the invention as defined in the appended claims.

Having thus described my invention, what I claim and desire to secure by Letters Patent is:

1. In apparatus of the class described, the combination of a driving shaft, a driven shaft, a plurality of pairs of intermeshing gears of different ratios on said shafts, the gears on one shaft being secured thereto and the gears on the other shaft being loose thereon, clutch members secured on opposite sides of one or more of said loose gears, one or more clutch members splined on the shaft which carries said loose gears and adapted to coöperate with either of two of said clutch members to connect the gears to which they are secured to the shaft on which they are mounted, speed responsive means and means whereby the second mentioned clutch members are shifted by said speed responsive means.

2. In apparatus of the class described, the combination of a driving shaft, a driven shaft, a plurality of pairs of intermeshing gears of different ratios on said shafts, the gears on one shaft being secured thereto and the gears on the other shaft being loose thereon, clutch members secured to the opposite sides of said loose gears, clutch members splined on the shaft on which said loose gears are mounted and adapted to coöperate with either of two of the first mentioned clutch members to secure the gears to which the latter are connected to the shaft on which the gears are mounted, speed responsive means and means automatically actuated by said speed responsive means to successively shift the second mentioned clutch members into and out of engagement with their coöperating clutch members.

3. In apparatus of the class described, the combination of a driving shaft, a driven shaft, a plurality of pairs of intermeshing gears of different ratios on said shafts, the gears on one shaft being secured thereto and the gears on the other shaft being loose thereon, clutch members secured to said loose gears, clutch members splined on the shaft on which said loose gears are mounted and adapted to coöperate with the members secured to said gears, speed responsive means driven from said driven shaft and means actuated by said speed responsive means to successively shift the second mentioned clutch members to increase and decrease the speed ratio between said shafts in accordance with the variations in the speed of the driven shaft.

4. In apparatus of the class described, the combination of a driving shaft, a driven shaft, a plurality of pairs of intermeshing gears of different ratios on said shafts, the gears on one shaft being secured thereto and the gears on the other shaft being loose thereon, means for rotating said driving shaft in either direction, clutch members for connecting said loose gears with the shaft on which they are mounted when said driving shaft is rotated in one direction, clutch members for connecting one of said loose gears with the shaft on which it is mounted when said driving shaft is rotated in the direction opposite to that above mentioned, manually operable means for actuating the clutch members associated with said last mentioned loose gear, speed responsive means and means automatically actuated by said speed responsive means for effecting engagement and disengagement of the clutch members associated with the others of said loose gear.

5. In apparatus of the class described, the combination of a driving shaft, a driven shaft, a plurality of pairs of intermeshing gears of different ratios on said shafts, the gears on one of said shafts being secured thereto and the gears on the other shaft being loose thereon, clutch members secured to said loose gears, clutch members adapted to coöperate with the first mentioned clutch members and splined on the shaft on which said loose gears are mounted, means for normally holding the second mentioned clutch members in neutral position, speed responsive means and means actuated by said speed responsive means and coöperating with the second mentioned clutch members to move the same into engagement with their coöperating clutch members so as to separately connect said loose gears in succession to the shaft on which they are mounted.

6. In apparatus of the class described, the combination of a driving shaft, a driven shaft, a plurality of pairs of intermeshing gears of different ratios on said shafts, the gears on one shaft being secured thereto and the gears on the other shaft being loose thereon, clutch members secured to the adjacent sides of two of said loose gears, a clutch member between the first mentioned clutch members and splined on the shaft upon which said loose gears are mounted, means for normally holding the second mentioned clutch member in the neutral position between the first mentioned clutch members, speed responsive means driven from said driven shaft, and means actuated by said speed responsive means and coöperating with the second mentioned clutch member to move the latter into engagement with one of its coöperating clutch members upon an increase in speed of the driven shaft and into engagement with the other of its coöperating clutch members upon a decrease in the speed of the driven shaft.

7. In apparatus of the class described, the combination of a driving shaft, a driven shaft, a plurality of pairs of intermeshing gears of different ratios on said shafts, the gears on one shaft being secured thereto and the gears on the other shaft being loose thereon, clutch members secured to the adjacent sides of two of said loose gears, a clutch member between the first mentioned clutch members and splined on the shaft upon which said loose gears are mounted, means for normally holding the second mentioned clutch member in the neutral position between the first mentioned clutch members, speed responsive means driven from said driven shaft, means actuated by said speed responsive means and coöperating with the second mentioned clutch member to move the latter into engagement with one of its coöperating clutch members upon an increase in speed of the driven shaft and into engagement with the other of its coöperating clutch members upon a decrease in the speed of the driven shaft, and means whereby said driven shaft may be rotated in either direction.

8. In apparatus of the class described, the combination of a driving shaft, a driven shaft, a plurality of pairs of intermeshing gears of different ratios on said shafts, the gears on one shaft being secured thereto and the gears on the other shaft being loose thereon, clutch members secured to the adjacent sides of two of said loose gears, a clutch member between the first mentioned clutch members and splined on the shaft upon which said loose gears are mounted, means for normally holding the second mentioned clutch member in the neutral position between the first mentioned clutch members, speed responsive means driven from said driven shaft, and means actuated by said speed responsive means to move the second mentioned clutch member into engagement with its coöperating clutch member to drive the driven shaft from the driving shaft through the pair of gears having the higher ratio when the speed of the driven shaft increases and to move the second mentioned clutch member into engagement with the other coöperating clutch member upon a reduction in the speed of the driven shaft so as to drive the latter shaft through the pair of gears having the lower speed ratio.

In testimony whereof I affix my signature.

ALBERT HUPP.